US012705574B2

(12) United States Patent
Scheibelhut et al.

(10) Patent No.: US 12,705,574 B2
(45) Date of Patent: Aug. 11, 2026

(54) MACHINE LEARNED MODEL FOR PROACTIVELY SELECTING A REMEDIAL ACTION USING BEFORE RECEIVING A NOTIFICATION OF A PROBLEM WITH AN ORDER

(71) Applicant: Maplebear Inc., San Francisco, CA (US)

(72) Inventors: Brent Scheibelhut, Toronto (CA); George Ruan, Brooklyn, NY (US); Simon Jenkins, Alamo, CA (US); Eduardo Alejandro Colina Mancheno, Toronto (CA)

(73) Assignee: Maplebear Inc., San Francisco, CA (US)

( * ) Notice: Subject to any disclaimer, the term of this patent is extended or adjusted under 35 U.S.C. 154(b) by 85 days.

(21) Appl. No.: 18/753,857

(22) Filed: Jun. 25, 2024

(65) Prior Publication Data

US 2025/0390835 A1 Dec. 25, 2025

(51) Int. Cl.
*G06Q 10/087* (2023.01)

(52) U.S. Cl.
CPC .................................. *G06Q 10/087* (2013.01)

(58) Field of Classification Search
CPC ......................... G06Q 10/087; G06Q 30/0635
See application file for complete search history.

(56) References Cited

U.S. PATENT DOCUMENTS 8,417,715 B1 * 4/2013 Bruckhaus ............. G06Q 10/04 705/26.1
2010/0223099 A1 * 9/2010 Johnson ............. G06Q 30/0243 705/14.42
2013/0030875 A1 * 1/2013 Lee .................... G06Q 30/0601 705/14.58
2020/0234365 A1 * 7/2020 Friedman ........... G06Q 30/0224
2023/0214869 A1 * 7/2023 Ranjan ............... G06Q 30/0205 705/14.13
2025/0124402 A1 * 4/2025 Agarwal ............ G06Q 30/0631

* cited by examiner

*Primary Examiner* — Florian M Zeender
*Assistant Examiner* — Kimberly S. Bursum
(74) *Attorney, Agent, or Firm* — Fenwick& West LLP

(57) ABSTRACT

An online concierge system fulfills orders placed by users. When a user notifies the online concierge system of a problem with order fulfillment, the online concierge system performs one or more remedial actions (e.g., a credit, a discount, a free delivery). To provide a proactive remedial action before receiving a notification of a problem with order fulfillment from a user, the online concierge system trains a proactive remediation model that predicts, for an order having an event during fulfillment, a likelihood of loss of interaction by the user with the online concierge system (i.e., "churn" of the user) without performing a proactive remedial action. When fulfilling an order, in response to determining an event during fulfillment, the online concierge system applies the proactive remediation model to determine the likelihood of churn of the user if no proactive appeasement is performed, for determining whether to perform a proactive remedial action.

20 Claims, 4 Drawing Sheets

MACHINE LEARNED MODEL FOR PROACTIVELY SELECTING A REMEDIAL ACTION USING BEFORE RECEIVING A NOTIFICATION OF A PROBLEM WITH AN ORDER

BACKGROUND

Online concierge systems receive orders for items from users and allocate the orders to pickers. A picker to whom an order was allocated obtains items included in the order from a retailer identified by the order to fulfill the order. Subsequently, the picker delivers the obtained items to a location specified in the order by the user.

Various problems may occur with fulfillment of orders that affect user engagement (i.e., interaction) with an online concierge system. For example, a picker being unable to obtain one or more items included in an order affects a likelihood of a user subsequently engaging with the online concierge system. As another example, a picker delivering items in an order at a time later than a time interval included in an order reduces a likelihood of the user subsequently engaging with the online concierge system.

To mitigate a likelihood of reduced user engagement from a problem with fulfillment of an order, an online concierge system may perform various remedial actions for the user. Example remedial actions include the online concierge system providing a discount on a subsequent order from a user, the online concierge system paying a portion of a user's cost for the online concierge system fulfilling an order, or other actions by the online concierge system to provide a form of compensation or credit to the user.

Conventional online concierge systems perform a remedial action for a problem occurring during order fulfillment in response to receiving a notification of the problem from a user. However, many users reduce their subsequent interaction with the online concierge system in response to a problem with order fulfillment without notifying the online concierge system of the problem with order fulfillment. This conditioning of a remedial action on receiving a notification of a problem from a user prevents the online concierge system from mitigating loss of engagement from users who fail to notify the online concierge system of a problem with fulfillment of an order.

SUMMARY

In accordance with one or more aspects of the disclosure, an online concierge system receives an order for fulfillment from a user. The order includes one or more items, a retailer from whom the one or more items are to be obtained, a time for delivering the one or more items, and a location to which the one or more items are to be delivered, as well as additional characteristics. The online concierge system allocates the order to a picker, who fulfills the order by obtaining the one or more items from the retailer identified in the order and delivering the one or more items to the retailer identified in the order.

As the picker fulfills the order, the online concierge system receives information from the picker describing fulfillment. For example, the online concierge system receives identifiers of items included in the order that the picker obtained. from a picker client device. The online concierge system also receives identifiers of one or more items included in the retailer that the picker was unable to obtain from the retailer included in the order. In another example, the online concierge system receives a notification from the picker when the picker replaces an item included in the order with a replacement item. that identifies the replacement item. Additionally, the online concierge system receives a delivery indication from the picker when the picker delivers items obtained from the retailer in the order to the location included in the order. In various embodiments, the delivery indication includes a time when the picker delivered the items obtained by the retailer to the location included in the order. Receiving information from the picker describing fulfillment of the order allows the online concierge system to determine a status of order fulfillment by the picker.

When a problem affects fulfillment of the order, the user from whom the order was received may subsequently decrease interaction with the online concierge system, referred to herein as "churn" of the user or churn occurring for the user. In various embodiments, churn of the user occurs if greater than a threshold amount of time lapses between the online concierge system receiving consecutive orders from the user. For example, a picker being unable to obtain an item from the order from a retailer identified in the order causes the user to wait greater than the threshold amount of time from fulfillment of the order to the online concierge system receiving a subsequent order from the user. As another example, a picker fulfilling the order later than a time interval specified by the order causes the online concierge system to stop receiving orders from the user. Churn of the user reduces an amount of interaction with the online concierge system by the user, decreasing overall revenue to the online concierge system from the user.

In various embodiments, the online concierge system mitigates churn of the user from a problem with fulfilling the order by performing one or more remedial actions. Different remedial actions may be performed by the online concierge system to compensate for different problems with fulfilling the order. Example remedial actions include: providing a credit to the user, providing a discount for the order to the user, providing a discount for a subsequent order to the user, providing free delivery of the items in the order to the user, or performing another action reducing a cost of the user of fulfilling the order or of fulfilling a subsequent order. In conventional configurations, the online concierge system performs a remedial action in response to receiving a notification from the user of a problem with fulfilling the order after the order was fulfilled. While performing a remedial action in response to receiving a notification of a problem with fulfilling the order mitigates the problem with fulfilling the order to decrease a likelihood of churn occurring for the user, many users do not transmit a notification of a problem with fulfilling an order. This lack of notification of problems with fulfilling orders from users prevents the online concierge system from mitigating problems with fulfilling various orders from those users, increasing a likelihood of churn of the users who do not notify the online concierge system of problems with fulfilling orders.

To further reduce churn from a greater number of users, the online concierge system identifies a problem with fulfillment of the order in response to a portion of the information describing fulfillment of the order matching one or more stored criteria. In various embodiments, the online concierge system stores a set of problems, with each problem associated with one or more criteria, allowing the online concierge system to identify different problems with order fulfillment based on information describing fulfillment of the order. Using the information describing fulfillment of the order and stored criteria allows the online concierge system to automatically identify a problem with order fulfillment without relying on the user to transmit a notification of a problem with order fulfillment. This allows proactive identification of a problem with order fulfillment by the online concierge system before the user identifies the problem.

In response to identifying a problem with order fulfillment based on the information describing fulfillment, the online concierge system applies a proactive remediation model to characteristics of the user from whom the order was received and to attributes of the order. Based on the characteristics of the user and the attributes of the order, the proactive remediation model determines a probability of churn of the user occurring without the online concierge system performing a remedial action. An example characteristic of the user is a churn rate of the user determined from orders previously fulfilled for the user. In various embodiments, the churn rate is based on a frequency with which the user places orders with the online concierge system. Another example characteristic of the user comprises a number of orders previously received from the user or a cumulative number of orders received from the user. In some embodiments, an example characteristic of the user is an indication of whether a count of orders received from the user is less than a threshold number.

An example attribute of the order is a rate at which an item included in the order was previously found by pickers. The rate may be a frequency with which the item was obtained from a retailer included in the order in various embodiments. For example, an attribute of the order may be a rate at which pickers previously obtained an item in the order that the online concierge system determined was unable to be obtained from the retailer included in the order when identifying the problem with the order. An additional example of an attribute of an order may be a type of item identified as unable to be obtained at the retailer. For example, the online concierge system maintains one or more trained classification models that are applied to a combination of an order and an item, with a classification model determining whether an item is a foundational item for the order based on characteristics of the order (e.g., the set of items included in the order, prior orders received from the user, etc.). A foundational item is a focal point of the order, so an inability to include a foundational item in the order is correlated with a greater probability of churn occurring for the user. A retailer type based on a retailer included in the order may additionally or alternatively be an attribute 430 of the order. Another attribute of an order comprises a tip amount specified by the user for the picker fulfilling the order. In some embodiments, an attribute of an order describes weather occurring when the order was fulfilled, as certain types of weather influence the availability of various items at a retailer and an amount of time for a picker to fulfill the order. An additional example attribute of an order is a holiday indication of whether a holiday occurs within a threshold amount of time from a time for fulfillment indicated in the order.

The online concierge system trains the proactive remediation model through a backpropagation training process. During the training process, the online concierge system applies the proactive remediation model to multiple training examples. Each training example includes characteristics of a training user from whom a prior order was received and attributes of the prior order received from the training user. In various embodiments, each training example includes characteristics of a training user and a prior order where a problem occurred with fulfilling the prior order, the online concierge system did not receive a notification of the problem with the prior order from the training user, and churn occurred for the prior user. A label applied to each training example indicates whether churn occurred for the training user in response to fulfillment of the prior order. For example, the label has a first value in response to churn occurring for the training user from whom the prior order was received and has a second value in response to churn not occurring for the training user from whom the prior order was received.

Application of the proactive remediation model to a training example generates a predicted probability of churn occurring for the training user occurring without the online concierge system providing a remedial action before the online concierge system receives a notification of a problem with fulfillment of the prior order from the training user. The machine learning training module scores the output from the proactive remediation model using a loss function that generates a score based on a difference between a label of a training example and a predicted probability generated by the proactive remediation model. The score is higher when the proactive remediation model performs poorly and lower when the proactive remediation model performs well. Example loss functions include a mean square error function, a mean absolute error, hinge loss function, and a cross-entropy loss function. The online concierge system updates a set of parameters for the proactive remediation model based on the score generated by the loss function.

Based on the probability of churn of the user occurring without the online concierge system performing a remedial action generated by the proactive remediation model, the online concierge system generates a set of expected values, with each expected value corresponding to a remedial action. Different remedial actions may mitigate different problems with order fulfillment. Each remedial action has an associated cost to be performed to the online concierge system, and the expected value for a remedial action is based on the cost of performing a remedial action, the probability of churn of the user occurring without the online concierge system performing a remedial action, and an expected amount of revenue to the online concierge system from the user.

Based on the set of expected values, the online concierge system selects a remedial action and transmits the selected remedial action to a user client device before the online concierge system receives a notification of the problem with order fulfillment from the user. For example, the online concierge system transmits the selected remedial action to the user client device at a time when a picker delivers the one or more items included in the order to a location included in the order. As another example, the online concierge system transmits the selected remedial action to the user client device before the time when the picker delivers the one or more items included in the order to the location included in the order. Transmitting the selected remedial action to the user client device before the online concierge system receives a notification of the problem with the order allows the online concierge system to proactively mitigate a problem with fulfillment that the online concierge system identified, decreasing a likelihood of the problem reducing the user's subsequent interaction with the online concierge system. Additionally, transmitting the selected remedial action to the user client device in response to the online concierge system identifying the problem with order fulfillment allows the online concierge system to provide remedial actions to a larger number of users than when transmission of remedial actions is conditioned on the online concierge system receiving a notification of a problem with order fulfillment from the user.

DETAILED DESCRIPTION

Figure 1:
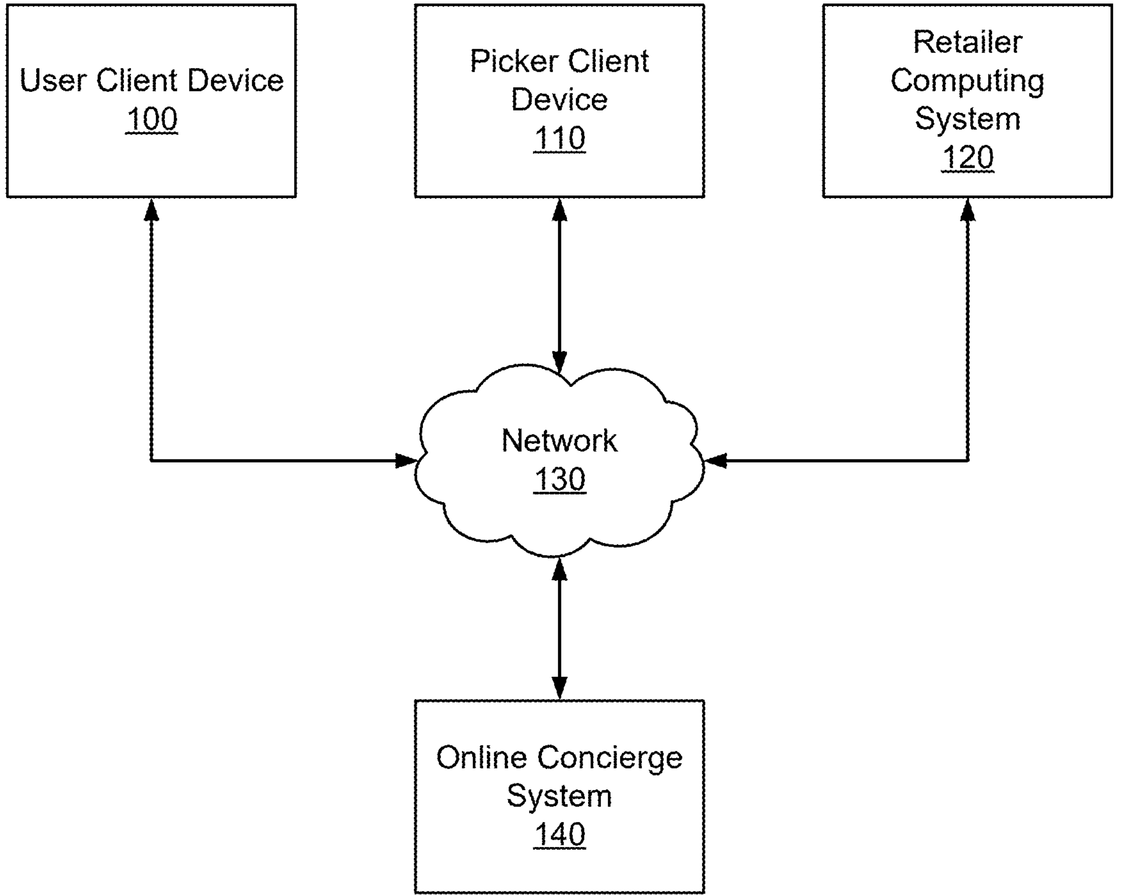
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, users, pickers, and retailers may be generically referred to as "users" of the online concierge system 140. Additionally, while one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user such that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provides portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
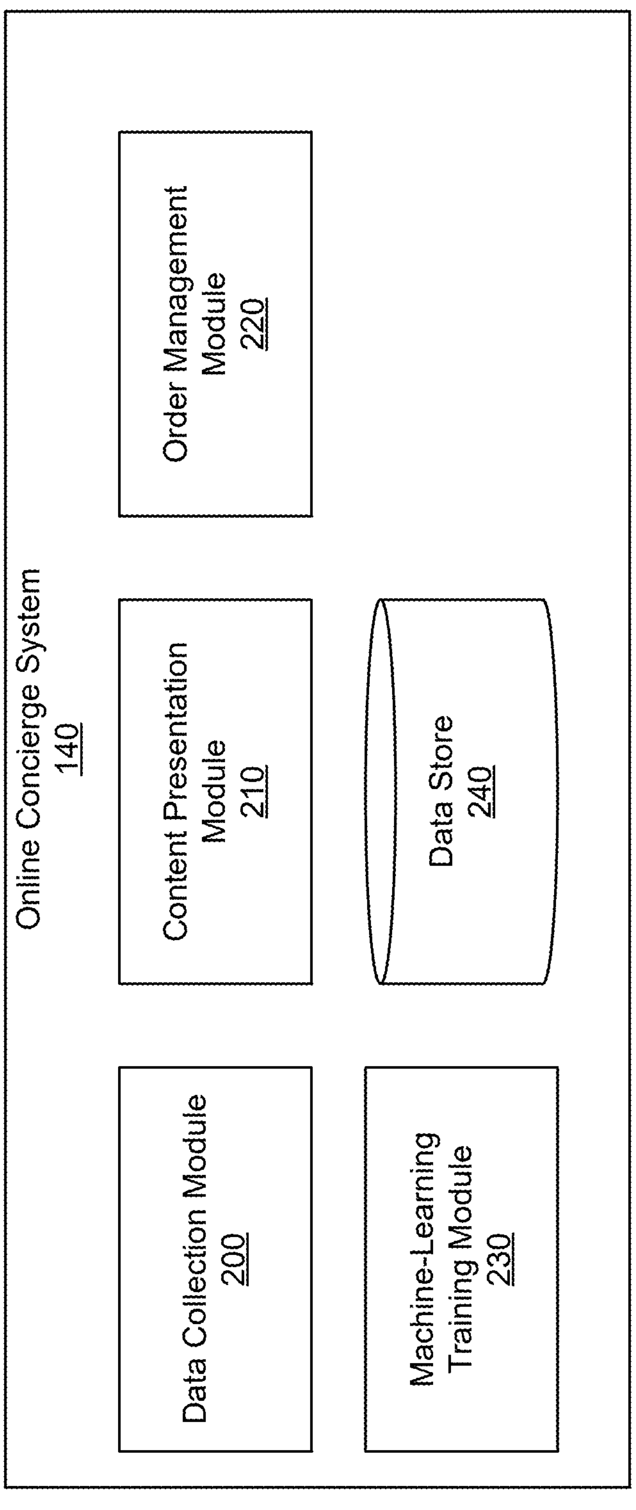
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 100. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

In various embodiments, the order management module 220 leverages information describing fulfillment of an order to identify a problem with fulfilling the order. Example problems affecting fulfillment of an order include: a picker being unable to obtain an item in the order, a picker replacing an item in the order with a replacement item, a picker delivering items in the order later than a time interval included in the order, or other events preventing a user from receiving items in an order consistent with one or more parameters the user specified in the order. Different types of problems may affect order fulfillment. When a problem with order fulfillment occurs, a user from whom an order was received may subsequently decrease interaction with the online concierge system 140, referred to herein as "churn" of the user or churn occurring for the user. In various embodiments, churn of the user occurs if greater than a threshold amount of time lapses between the online concierge system 140 receiving consecutive orders from the user.

To reduce a likelihood of churn occurring for a user when a problem affects fulfillment of an order from the user, the order management module 220 performs one or more remedial actions for the user. Different remedial actions may be performed to compensate for different types of problems with fulfilling an order for a user. Example remedial actions include: providing a credit to the user, providing a discount for the order to the user, providing a discount for a subsequent order to the user, providing free delivery of the items in the order to the user, or performing another action reducing a cost of the user of fulfilling the order or of fulfilling a subsequent order. While the order management module 220 may perform a remedial action in response to receiving a notification from the user of a problem with fulfilling the order after the order was fulfilled, many users reduce interaction with the online concierge system 140 without transmitting a notification of a problem with fulfilling an order. This lack of notification of problems with fulfilling orders from users prevents the online concierge system from mitigating problems with fulfilling various orders from those users, increasing a likelihood of churn of the users who do not notify the online concierge system of problems with fulfilling orders.

In various embodiments, the order management module 220 proactively performs a remedial action for a user in response to identifying a problem with an order received from the user. The order management module 220 compares information describing fulfillment of the order from the picker fulfilling the order to criteria corresponding to different problems with order fulfillment. Comparing information describing fulfillment of the order to criteria for various problems allows the order management module 220 to automatically identify a problem with order fulfillment without relying on the user to transmit a notification of a problem with order fulfillment. In response to the order management module 220 determining information describing fulfillment of the order matches at least a threshold amount of criteria for a problem, the order management module 220 generates a probability of churn of the user occurring without the order management module 220 performing a remedial action before receiving a notification of the problem with fulfillment of the order from the user. As further described below in conjunction with FIGS. 3 and 4, the order management module 220 applies a proactive remediation model to characteristics of the user and to attributes of the order to generate the probability of churn of the user occurring without the order management module 220 performing a remedial action before receiving a notification of the problem with fulfillment of the order from the user. Based on costs to the online concierge system 140 to perform different remedial actions and the probability of churn of the user occurring without the order management module 220 performing a remedial action before receiving a notification of the problem with fulfillment of the order from the user, the order management module 220 selects and performs a remedial action for the user, as further described below in conjunction with FIGS. 3 and 4.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains a proactive remediation model to generate a predicted probability of churn occurring for a user without the order management module 220 performing a remedial action before receiving a notification of the problem with fulfillment of an order from the user. The proactive remediation model receives various characteristics of the user and attributes of an order as input. As further described below in conjunction with FIG. 3, the machine learning training module 230 applies the proactive remediation model to characteristics of the user and to attributes of the order. Example characteristics of the user include a churn rate of the user based on a frequency with which the user places orders with the online concierge system, a number of orders previously received from the user, a cumulative number of orders received from the user, an indication of whether a count of orders received from the user is less than a threshold number, or other information describing prior interactions with the online concierge system 140 by the user. Example attributes of an order include: a rate at which an item included in the order was previously found by pickers, a rate at which pickers found an item in the order determined to be unable to be obtained from the retailer included in the order the order management module 220 identified a problem with the order, a type of item identified as unable to be obtained at the retailer, a retailer type based on a retailer, a tip amount specified by the user for the picker fulfilling the order, descriptive information of weather, weather when the order was fulfilled, a holiday indication of whether a holiday occurs within a threshold amount of time from a time for fulfillment indicated in the order, or other information describing items in an order or information affecting fulfillment of the order.

As further described below in conjunction with FIGS. 3 and 4, when training the proactive remediation model, the machine learning training module 230 retrieves historical orders fulfilled for one or more users and information describing historical interaction with the online concierge system 140 by users. From the historical order and historical interactions, the machine learning training module 230 generates a training dataset including multiple training examples. Each training example includes characteristics of a training user and attributes of a prior order, such as those further described above. In various embodiments, the machine learning training module 230 generates the training examples based on prior orders from training users where a problem occurred with fulfilling a prior order, the online concierge system 140 did not receive a notification of the problem with the prior order from a corresponding training user, and churn occurred for the prior user. A label applied to each training example indicates whether churn occurred for the training user in response to fulfillment of the prior order, as further described below in conjunction with FIG. 3.

The machine learning training module 230 applies the proactive remediation model to multiple training examples, with application of the proactive remediation model to a training example generating a predicted probability of churn occurring for a training user without the order management module 220 performing a remedial action before receiving a notification of the problem with fulfillment of a prior order from the training user. As further described below in conjunction with FIG. 3, the machine learning training module 230 trains the proactive remediation model by applying the proactive remediation model to a training example, scoring the proactive remediation model by comparing an output of the proactive remediation model to the label associated with the training example, and updating weights comprising the proactive remediation model through a back-propagation process until one or more criteria are satisfied.

The data store 240 stores data used by the online concierge system 140. For example, the data store 240 stores user data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
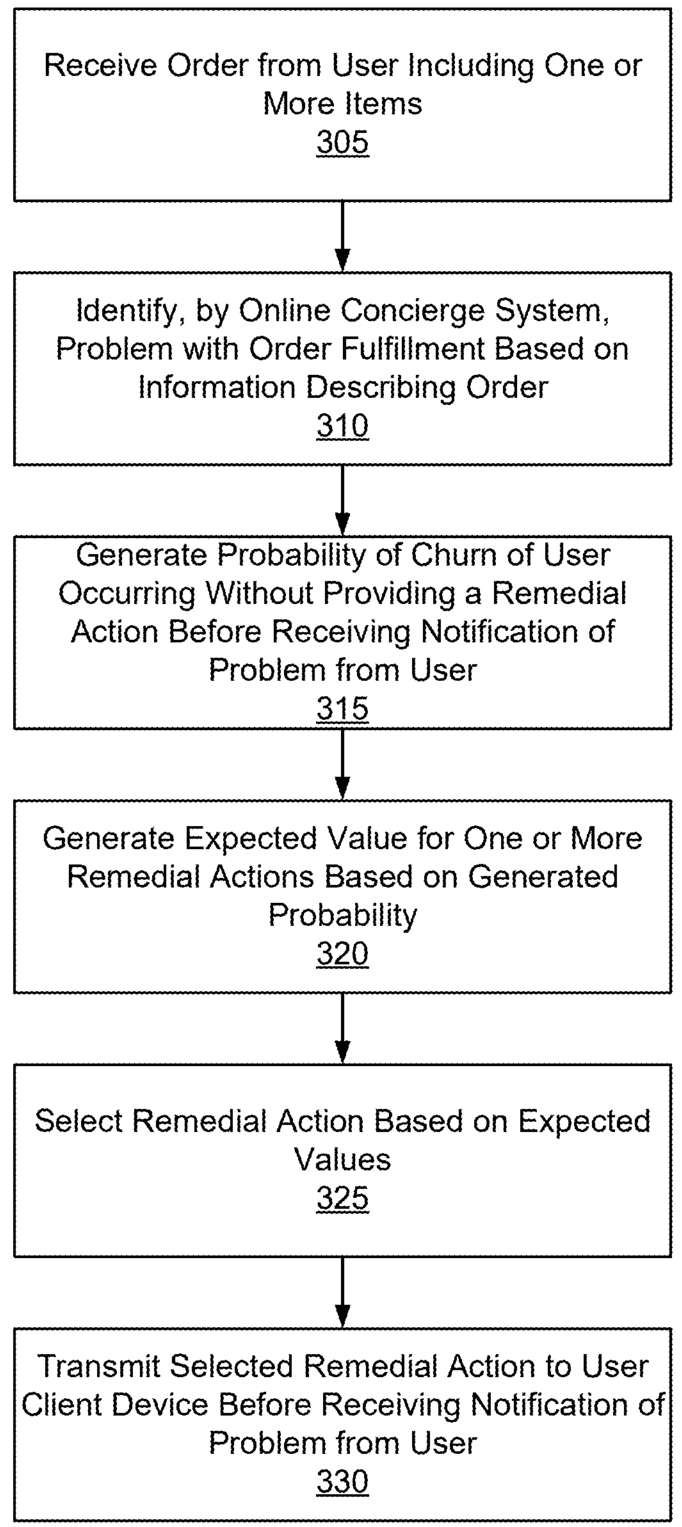
FIG. 3 is a flowchart of a method for determining whether an online concierge system performs a proactive remedial action for a user before receiving a notification from the user of a problem with fulfilling an order, in accordance with one or more embodiments.

FIG. 3 is a flowchart of a method for determining whether an online concierge system 140 performs a proactive remedial action for a user before receiving a notification from the user of a problem with fulfilling an order, in accordance with one or more embodiments, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 305 an order from a user for fulfillment. The order includes one or more items and identifies a retailer from which the items are to be obtained. Additionally, the order includes a location where the items are to be delivered and a time interval when the user expects the items to be delivered to the location. In various embodiments, the order includes additional or alternative characteristics related to obtaining and delivering items to a location. After receipt, the online concierge system 140 allocates the order to a picker for fulfillment.

As the picker fulfills the order by obtaining items included in the order from the retailer and delivering the obtained items to a location identified by the order, the online concierge system 140 receives information describing order fulfillment from the picker. For example, the online concierge system 140 receives an indication from the picker that an item in the order has been obtained in response to the picker obtaining the item from the retailer. As another example, the online concierge system 140 receives a notification from the picker when the picker is unable to obtain an item included in the order from the retailer. In another example, the online concierge system 140 receives a notification from the picker when the picker replaces an item included in the order with a replacement item. Additionally, the online concierge system 140 receives a delivery indication from the picker when the picker delivers items obtained from the retailer in the order to the location included in the order. The delivery indication indicates a time when the picker delivered items obtained from the retailer to the location included in the order in various embodiments. Other information describing fulfillment of the order includes times when the picker performed different actions when fulfilling the order (e.g., left a retailer, completed obtaining items from the retailer, etc.). Receiving information describing fulfillment of the order from the picker fulfilling the order allows the online concierge system 140 to determine a status of order fulfillment by the picker.

The picker may encounter a problem with fulfillment of the order. A problem with fulfillment may be the picker being unable to obtain an item included in the order or being unable to deliver obtained items to a location included in the order during a time interval specified by the order. However, other problems may occur that prevent the picker from satisfying parameters specified in the order by the retailer. The online concierge system 140 stores a set of problems with each problem associated with one or more criteria that, when satisfied by information describing fulfillment of the order, indicate a corresponding problem occurred. For example, the set of problems includes: an indication the picker was unable to obtain an item included in the order, an indication the picker replaced an item included in the order with a replacement item, and an indication the picker delivered the items to the location in the order later than the time interval included in the order. However, in other embodiments, the set of problems includes different or additional problems than those previously listed.

The online concierge system 140 compares information describing fulfillment of the order from the picker to the stored set of problems. In response to a portion of the information describing fulfillment of the order matching at least a threshold amount of criteria associated with a problem in the stored set, the online concierge system 140 identifies 310 a problem with fulfillment of the order. For example, the online concierge system 140 identifies 310 a problem with fulfillment of the order in response to information describing fulfillment of the order including an indication that the picker was unable to obtain an item included in the order. As another example, the online concierge system 140 identifies 310 a problem with fulfillment of the order in response to information about fulfillment of the order indicating the picker delivered items included in the order to the location included in the order later than the time interval included in the order.

A problem with fulfillment of the order may cause loss of interaction by the user with the online concierge system 140, referred to herein as "churn" for the user or churn occurring for the user. In various embodiments, churn occurs for a user when greater than a threshold amount of time lapses between consecutive orders the online concierge system 140 receives from the user. For example, a problem with fulfillment of the order causes greater than a threshold amount of lapse to pass between the online concierge system 140 receiving 305 the order from the user and the online concierge system 140 receiving a subsequent order from the user, indicating churn of the user. When churn occurs for a user, an amount of interaction with the online concierge system 140 by the user is reduced, which decreases overall revenue the online concierge system 140 obtains from the user.

To mitigate churn of the user from a problem with fulfilling the order, the online concierge system 140 may perform one or more remedial actions to offset the problem with fulfilling the order. Different remedial actions may be performed to compensate for different problems with fulfilling the order. Example remedial actions include: providing a credit to the user, providing a discount for the order to the user, providing a discount for a subsequent order to the user, providing free delivery of the items in the order to the user, or performing another action reducing a cost of the user of fulfilling the order or of fulfilling a subsequent order. In various embodiments, the online concierge system 140 performs a remedial action in response to receiving a notification from the user of a problem with fulfilling the order after the order was fulfilled. While performing a remedial action in response to receiving a notification of a problem with fulfilling the order allows the online concierge system 140 to provide a form of mitigation for the problem with fulfilling the order, many users do not transmit the notification of the problem with fulfilling the order while reducing interaction with the online concierge system 140. Hence, conditioning performance of a remedial action for a user on receiving a notification of a problem from the user prevents the online concierge system 140 from mitigating problems with fulfilling various orders from users who do not provide notifications of problems with order fulfillment to the online concierge system 140, increasing a likelihood of churn of various users with the online concierge system 140 and increasing a number of users for whom churn may occur.

To further reduce a number of users for whom churn may occur or to reduce a likelihood of churn occurring for the user, identifying 310 a problem with fulfillment of the order in response to a portion of the information describing fulfillment of the order matching a threshold amount of criteria associated with a stored problem leverages information describing fulfillment of the order to proactively identify the problem before receiving a notification of the problem from the user. This allows the online concierge system 140 to identify 310 a problem with fulfillment of the order before the user, enabling the online concierge system 140 to mitigate the problem more quickly. In response to the online concierge system 140 identifying 310 the problem with fulfillment of the order from the information about fulfillment of the order before receiving a notification of the problem from the user, the online concierge system 140 generates 315 a probability of churn of the user occurring without the online concierge system 140 performing a remedial action before the online concierge system 140 receives a notification of the problem from the user. To generate the probability of churn of the user occurring without the online concierge system 140 performing a remedial action before the online concierge system 140 receives a notification of the problem from the user, the online concierge system 140 applies a proactive remediation model to attributes of the order and to characteristics of the user.

The proactive remediation model comprises a set of weights stored on a non-transitory computer readable storage medium in various embodiments. The online concierge system 140 trains the proactive remediation model by generating a training dataset including multiple training examples. Each training example includes characteristics of a training user and attributes of a prior order the online concierge system 140 fulfilled for the training user. In various embodiments, to generate the training dataset, the online concierge system 140 retrieves prior orders from the data store 240 where the online concierge system 140 identified a problem with the prior order, the online concierge system 140 did not receive a notification of the problem from the training user, and churn occurred for the prior user. Thus, in some embodiments, various training examples include characteristics of a training user and attributes of a prior order where the online concierge system 140 identified a problem with the prior order, the online concierge system 140 did not receive a notification of the problem from the training user, and churn occurred for the prior user. This bases the training dataset on prior orders where churn occurred for users from whom the prior orders were received but the users did not notify the online concierge system 140 of a problem encountered during order fulfillment. Additionally, prior orders from training users where the online concierge system 140 identified a problem with order fulfillment and did not receive a notification of the problem from a training user, but where the training user did not churn may also be included as complementary training examples in various embodiments. Each training example has a label indicating whether churn occurred for the training user included in the training example. For example, the label of a training example has a particular value when churn occurred for the training user in the training example and has an alternative value when churn did not occur for the training user in the training example.

To train the proactive remediation model, the online concierge system 140 initializes the set of weights comprising the proactive remediation model, the online concierge system 140 applies the proactive remediation model to multiple training examples of the training dataset. Applying the proactive remediation model to multiple training examples generates the parameters (e.g., the weights) for the proactive remediation model. The parameters comprising the proactive remediation model transform the input data-characteristics of a user and attributes of an order received from the user-into a predicted probability of churn occurring for the user without the online concierge system 140 providing a remedial action before the online concierge system 140 receives a notification from the user of a problem with fulfillment of the order. When applied to a training example, the proactive remediation model generates a predicted probability of churn of the training user in the training example occurring without the online concierge system 140 providing a remedial action before the online concierge system 140 receives a notification of a problem with fulfillment of the prior order in the training example from the training user.

For each training example to which the proactive remediation model is applied, the online concierge system 140 generates a score comprising an error term based on the predicted probability of churn of the training user in the training example occurring without the online concierge system 140 providing a remedial action before receiving a notification of a problem with fulfillment of the prior order in the training example from the training user and the label applied to the training example. The error term is larger when a difference between the predicted probability of churn of the training user in the training example occurring without the online concierge system 140 providing a remedial action before receiving a notification of a problem with fulfillment of the prior order in the training example from the training user and the label applied to the order classification training example is larger and is smaller when the difference between the predicted probability of churn of the training user in the training example occurring without the online concierge system 140 providing a remedial action before receiving a notification of a problem with fulfillment of the prior order in the training example from the training user and the label applied to the training example is smaller. In various embodiments, the online concierge system 140 generates the error term using a loss function based on a difference between the predicted probability of churn of the training user in the training example occurring without the online concierge system 140 providing a remedial action before receiving a notification of a problem with fulfillment of the prior order in the training example from the training user and the label applied to the training example using a loss function. Example loss functions include a mean square error function, a mean absolute error, a hinge loss function, and a cross-entropy loss function.

The online concierge system 140 backpropagates the error term to update the set of parameters comprising the proactive remediation model and stops backpropagation in response to the error term, or to the loss function, satisfying one or more criteria. For example, the online concierge system 140 backpropagates the error term through the proactive remediation model to update parameters of the proactive remediation model until the error term has less than a threshold value. For example, the online concierge system 140 may apply gradient descent to update the set of parameters. The online concierge system 140 stores the set of parameters comprising the proactive remediation model on a non-transitory computer readable storage medium after stopping the backpropagation.

In various embodiments, the proactive remediation model receives different characteristics of users and different attributes of orders as input. For example, a characteristic of a user is a churn rate of the user determined from orders the online concierge system 140 previously fulfilled for the user. In various embodiments, the churn rate is based on a frequency with which the user placed orders with the online concierge system 140. A churn rate of a user is higher when the online concierge system 140 less frequently receives orders from the user, while the churn rate of the user is lower when the online concierge system 140 more frequently receives orders from the user.

Another example characteristic of a user comprises a number of orders received from the user. For example, the online concierge system 140 determines a number of discrete orders, including the order for which the problem was identified 310, received from the user. In various embodiments, the online concierge system 140 determines a count of orders received from the user as the number of orders received from the user. Alternatively, an attribute of the order is an indication whether a count of orders received from the user is less than a threshold number, with the attribute having a first value in response to the count of orders received from the user being less than the threshold number and having a second value in response to the count of orders received from the user being greater than the threshold number.

The proactive remediation model receives various attributes of the order as inputs. For example, an attribute of an order comprises a rate at which an item included in the order was previously found by pickers. The rate may be a frequency with which the item was obtained from a retailer included in the order by pickers in various embodiments. The attribute of the order may be a rate at which pickers found an item in the order that the online concierge system 140 determined was unable to be obtained from the retailer included in the order when identifying 310 the problem with the order in various embodiments. For example, in response to identifying 310 a problem with fulfilling the order where a particular item is unable to be obtained at a retailer, the online concierge system 140 determines or retrieves the rate at which the particular item was previously found by pickers at the retailer.

Another example attribute of an order may be a type of item that was identified as unable to be obtained at the retailer included in the order. For example, the online concierge system 140 maintains one or more trained classification models that are applied to a combination of an order and an item (and may account for characteristics of a user), with a classification model determining whether an item is a foundational item for the order based on characteristics of the order (e.g., the set of items included in the order, prior orders received from the user, etc.). A foundational item is a focal point of the order, so an inability to obtain a foundational item in the order is correlated with a greater probability of churn occurring for the user, while an inability to obtain a non-foundational item in the order has less effect on a probability of churn occurring for the user. An attribute of the order may be a type indicator specifying whether an item unable to be obtained at the retailer is a foundational item for the order or is not a foundational item for the order.

An attribute of an order may be a retailer type of a retailer included in the order. In some embodiments, a retailer type is a score generated by the online concierge system 140 for a retailer based on information about the retailer. Alternatively, the retailer type is a category or classification associated with a retailer by the online concierge system 140. In some embodiments, the online concierge system 140 applies a retailer classification model to information about a retailer, with the retailer classification model generating a type of the retailer. Another example attribute of an order is an order type of the order. The online concierge system 140 may apply an order classification model to items in the order and prior orders received from the user, with the order classification model generating the order type of the order. For example, the order type indicates whether the order is a convenience order for a limited number of items that has less than a threshold likelihood of being repeated or is a bulk order for a larger number of items or for items likely to be obtained multiple times. The order type may be selected from a set of order types in various embodiments. Another attribute of an order comprises a tip amount specified by the user for the picker fulfilling the order. The tip amount may be identified as a specific amount of compensation or may be identified as a percentage of a cost for fulfilling the order in various embodiments.

In some embodiments, an attribute of an order describes weather occurring when the order was fulfilled, as different types of weather affect availability of various items at a retailer and an amount of time for a picker to fulfill the order. For example, an attribute of the order includes a category describing weather conditions during fulfillment of the order. In another example, an attribute of the order has a first value indicating weather conditions during fulfillment of the order had at least a threshold probability of affecting the order and has an alternative value indicating weather conditions during fulfillment of the order had less than the threshold probability of affecting the order. Another example attribute of an order is a holiday indication of whether a holiday occurs within a threshold amount of time from a time for fulfillment indicated in the order. For example, the holiday indication has a first value in response to a holiday occurring within the threshold amount of time from the time for fulfillment indicated in the order and has a second value in response to a holiday occurring within the threshold amount of time from the time for fulfillment indicated in the order. Different holidays may be associated with different threshold amounts of time in various embodiments, so the order may have various holiday indications corresponding to different holidays as attributes.

Training the proactive remediation model through application to the training dataset determines parameters comprising the proactive remediation model identifying relationships between different characteristics of a user and attributes of an order for which a problem with fulfillment of the order was identified and the predicted probability of churn of the training user in the training example occurring without the online concierge system 140 providing a remedial action before receiving a notification of a problem with fulfillment of the prior order. For example, the proactive remediation model determines a higher predicted probability of churn of a user occurring without the online concierge system 140 performing a remedial action before the online concierge system 140 receives a notification of a problem with fulfilment of an order from the user in response to a number of orders previously received from the user being less than a threshold value. As another example, a specific order type causes a lower predicted probability of churn of a user occurring without the online concierge system 140 performing a remedial action before the online concierge system 140 receives a notification of a problem with fulfillment of an order from the user than an alternative order type. In another example, an attribute of an order indicating weather conditions when the order was fulfilled had greater than a threshold probability of affecting order fulfillment results in a lower predicted probability of churn of a user occurring without the online concierge system 140 performing a remedial action before receiving a notification of a problem with fulfillment of an order from a user. As another example, an attribute of an order indicating a holiday occurs within a threshold amount of time from a time for fulfillment indicated in the order increases a predicted probability of churn of the user occurring without the online concierge system 140 performing a remedial action prior to receiving a notification of a problem with fulfillment of the order from the user. Other types of values for attributes of an order or for characteristics of a user otherwise affect the predicted probability of churn of the user occurring without the online concierge system 140 performing a remedial action before receiving a notification of a problem with fulfillment of an order from the user.

Based on the generated probability of churn of the user occurring without the online concierge system 140 performing a remedial action before receiving a notification of the problem from the user, the online concierge system 140 generates 320 an expected value for one or more remedial actions. Example remedial actions include: providing a credit to the user, providing a discount for the order to the user, providing a discount for a subsequent order to the user, providing free delivery of the items in the order to the user, or performing another action reducing a cost of the user of fulfilling the order or of fulfilling a subsequent order. The online concierge system 140 generates 320 an expected value of a remedial action based on an expected amount of revenue to the online concierge system 140 from the user, the probability of churn of the user occurring without the online concierge system 140 performing a remedial action before receiving a notification of the problem from the user, and a cost of the remedial action. The online concierge system 140 may apply one or more revenue prediction models to prior orders received from a user to determine the expected amount of revenue to the online concierge system 140 from the user. In some embodiments, the online concierge system 140 generates 320 an expected value of a remedial action by subtracting the cost of the remedial action from a product of the expected amount of revenue the online concierge system 140 from the user and the probability of churn of the user occurring without the online concierge system 140 performing a remedial action before receiving a notification of the problem from the user. In various embodiments, the online concierge system 140 determines multiple expected values for a remedial action, with each expected value corresponding to a different cost of the remedial action, allowing the online concierge system 140 to evaluate offering different amounts to the user for a remedial action.

In some embodiments, the online concierge system 140 generates 320 an expected value for one or more remedial actions in response to the probability of churn of the user occurring without the online concierge system 140 performing a remedial action before receiving a notification of the problem from the user equaling or exceeding a threshold value. For example, the online concierge system 140 generates 320 expected values for different remedial actions when the probability of churn of the user occurring without the online concierge system 140 performing a remedial action before receiving a notification of the problem from the user has at least a threshold value. In such embodiments, the online concierge system 140 does not generate 320 expected values for different remedial actions when the probability of churn of the user occurring without the online concierge system 140 performing a remedial action before receiving a notification of the problem from the user has less than the threshold value. Maintaining a threshold value for the probability of churn of the user occurring without the online concierge system 140 performing a remedial action before receiving a notification of the problem from the user allows the online concierge system 140 to limit evaluation of remedial actions to situations where there is at least a threshold probability of churn of the user occurring without the online concierge system 140 performing a remedial action before receiving a notification of the problem from the user.

Based on the expected values, the online concierge system 140 selects 325 a remedial action to perform before receiving a notification from the user of a problem with fulfilling the order. In some embodiments, the online concierge system 140 ranks remedial actions by their expected values and selects 325 a remedial action having a maximum position in the ranking. One or more characteristics of the user may be used by the online concierge system 140 to select a set of remedial actions in some embodiments, with the online concierge system 140 selecting 325 a remedial action of the set based on expected values of remedial actions of the set. For example, the online concierge system 140 selects 325 a remedial action of the set having a maximum expected value. In other embodiments, the online concierge system 140 selects a set of remedial actions based on an attribute of the order and selects 325 a remedial action of the set based on expected values of the remedial actions of the set (e.g., a remedial action of the set having a maximum expected value). For example, in response to the order including a specific type of retailer, the online concierge system 140 selects a set of remedial actions, such as a set including a particular remedial action with different costs for the particular remedial action, and selects 325 the particular remedial action with a specific cost from the set. This allows the online concierge system 140 to tailor the remedial action selected 325 for the user based on characteristics of the user or attributes of the order to select 325 a remedial action most likely to mitigate potential churn of the user from the identified problem with fulfillment of the order.

The online concierge system 140 transmits 330 the selected remedial action to a user client device 100 of the user before the online concierge system 140 receives a notification from the user of a problem with fulfilling the order. This provides the user with the remedial action before the user identifies the problem with fulfilling the order to the online concierge system 140. For example, the online concierge system 140 transmits 330 the selected remedial action to the user client device 100 of the user at a time before the picker fulfilling the order delivers the items from the order to the location included in the order. In another example, the online concierge system 140 transmits 330 the selected remedial action to the user client device 100 of the user at a time when the picker fulfilling the order delivers the items from the order to the location in the order. Such timing for transmitting 330 the selected remedial action to the user client device 100 provides the selected remedial action to the user before the user has an opportunity to transmit a notification of a problem with fulfillment of the order to the online concierge system 140. Proactively providing the selected remedial action to the user allows the online concierge system 140 to reduce a likelihood of the user's interaction with the online concierge system 140 decreasing because of a problem with fulfillment of the order. Additionally, transmitting 330 a remedial action before a user has an opportunity to transmit a notification of a problem with fulfillment of an order allows the online concierge system 140 to provide remedial actions for users who do not notify the online concierge system 140 of a problem with order fulfillment, allowing the online concierge system 140 to provide remedial actions to a broader range of users to mitigate a larger number of problems with order fulfillment.

Figure 4:
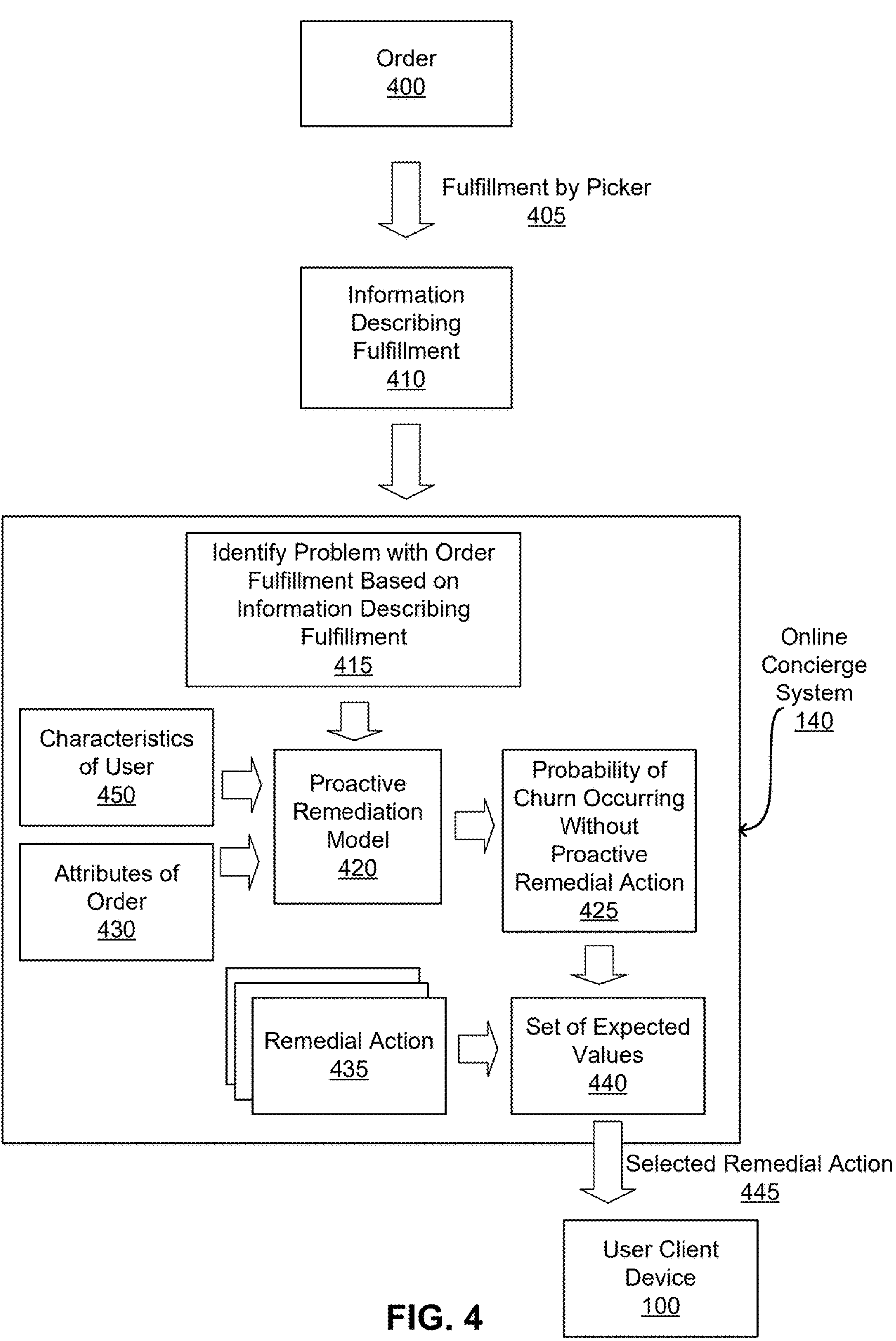
FIG. 4 is a process flow diagram of a method for determining whether an online concierge system performs a proactive remedial action for a user before receiving a notification from the user of a problem with fulfilling an order, in accordance with one or more embodiments.

FIG. 4 is a process flow diagram of one or more embodiments of a method for determining whether an online concierge system 140 performs a proactive remedial action for a user before receiving a notification from the user of a problem with fulfilling an order. The online concierge system 140 receives an order 400 for fulfillment from a user. The order 400 includes one or more items, a retailer from whom the one or more items are to be obtained, a time for delivering the one or more items, and a location to which the one or more items are to be delivered, as well as additional characteristics. The online concierge system 140 allocates the order 400 to a picker, who fulfills 405 the order 400 by obtaining the one or more items from the retailer identified in the order and delivering the one or more items to the retailer identified in the order.

As the picker fulfills 405 the order 400, the online concierge system 140 receives information 410 describing fulfillment, such as from the picker via the picker client device 110. For example, the online concierge system 140 receives identifiers of items included in the order that the picker obtained. The online concierge system 140 also receives identifiers of one or more items included in the retailer that the picker was unable to obtain from the retailer included in the order. In another example, the online concierge system 140 receives a notification from the picker when the picker replaces an item included in the order with a replacement item. Additionally, the online concierge system 140 receives a delivery indication from the picker when the picker delivers items obtained from the retailer in the order to the location included in the order. Information describing fulfillment of the order may additionally or alternatively identify a time when the picker checks out of the retailer, a time when the picket departs the retailer, or other information describing actions by the picker during fulfillment of the order 400. The information 405 received from the picker describing fulfillment of the order 400 allows the online concierge system 140 to determine a status of order fulfillment by the picker.

When a problem affects fulfillment of the order 400, the user from whom the order 400 was received may subsequently decrease interaction with the online concierge system 140, referred to herein as "churn" of the user or churn occurring for the user. In various embodiments, churn of the user occurs if greater than a threshold amount of time lapses between the online concierge system receiving consecutive orders from the user. For example, a picker being unable to obtain an item from the order 400 from a retailer identified in the order 400 causes the user to wait greater than a threshold amount of time from fulfillment of the order 400 to the online concierge system 140 receiving a subsequent order from the user. As another example, a picker fulfilling the order 400 later than a time interval specified by the order 400 causes the online concierge system 140 to stop receiving orders from the user. Churn of the user reduces an amount of interaction with the online concierge system 140 by the user, which decreases overall revenue to the online concierge system 140 from the user.

The online concierge system 140 mitigates churn of the user from a problem with fulfilling the order 400 by performing one or more remedial actions. Different remedial actions may be performed to compensate for different types of problems with fulfilling the order 400. Example remedial actions include: providing a credit to the user, providing a discount for the order to the user, providing a discount for a subsequent order to the user, providing free delivery of the items in the order to the user, or performing another action reducing a cost of the user of fulfilling the order or of fulfilling a subsequent order. The online concierge system 140 may perform a remedial action in response to receiving a notification from the user of a problem with fulfilling the order 400 after the order 400 was fulfilled. While performing a remedial action in response to receiving a notification of a problem with fulfilling the order 400 provides a measure of mitigation of the problem with fulfilling the order to decrease a likelihood of churn occurring for the user, many users do not transmit the notification of the problem with fulfilling the order 400 to the online concierge system 140, while reducing interaction with the online concierge system 140. A lack of notification of problems with fulfilling orders from users prevents the online concierge system 140 from mitigating problems with fulfilling orders from various users, increasing a likelihood of churn occurring for users who do not transmit notifications of problems with fulfilling orders.

To further reduce churn from a greater number of users, the online concierge system 140 identifies 415 a problem with fulfillment of the order 400 in response to a portion of the information 410 describing fulfillment of the order 400 matching one or more stored criteria. In various embodiments, the online concierge system 140 stores a set of problems with order fulfillment, with each problem associated with one or more criteria, allowing the online concierge system 140 to identify 415 different problems with order fulfillment based on information describing fulfillment of the order. Using the information 410 describing fulfillment of the order 400 and stored criteria allows the online concierge system 140 to automatically identify 415 a problem with order fulfillment without relying on the user to transmit a notification of a problem with order fulfillment. This allows the online concierge system 140 to proactively identify 410 a problem with order fulfillment before the user identifies the problem.

In response to identifying 415 the problem with order fulfillment based on the information 410 describing fulfillment, the online concierge system 140 applies a proactive remediation model 420 to characteristics 450 of the user from whom the order 400 was received and to attributes 430 of the order. The proactive remediation model 420 is trained through a backpropagation process through application to training examples, as further described above in conjunction with FIG. 3. An example characteristic 450 of the user comprises a churn rate of the user determined from orders previously fulfilled for the user. In various embodiments, the churn rate is based on a frequency with which the user places orders with the online concierge system 140. Another example characteristic 450 of the user comprises a number of orders previously received from the user or a cumulative number of orders received from the user. In some embodiments, an example characteristic 450 of the user is an indication of whether a count of orders received from the user is less than a threshold number. Periodically, in one or more embodiments, the system 140 collects user responses to the remedial actions and retrains the proactive remediation model 420 based on the observed behavior, thereby improving the proactive remediation model 420 continually as it is used.

An example attribute 430 of the order 400 is a rate at which an item included in the order was previously found by pickers. The rate may be a frequency with which the item was obtained from a retailer included in the order in various embodiments. The example attribute 430 of the order may be a rate at which pickers previously obtained an item in the order that the online concierge system 140 determined was unable to be obtained from the retailer included in the order when identifying 415 the problem with the order 400. An additional example of an attribute of the order 400 may be a type of item identified as unable to be obtained at the retailer. For example, the online concierge system 140 maintains one or more trained classification models that are applied to a combination of the order 400 and an item, with a classification model determining whether an item is a foundational item for the order 400 based on characteristics of the order 400 (e.g., the set of items included in the order 400, prior orders received from the user, etc.). A foundational item is a focal point of the order 400, so an inability to include a foundational item in the order 400 is correlated with a greater probability of churn occurring for the user. A retailer type based on a retailer included in the order 400 may additionally or alternatively be an attribute 430 of the order 400. A retailer type based on a retailer included in the order 400 may be an attribute 430 of the order 400. Similarly, an order type based on items included in the order 400 and orders previously received from the user. Another attribute 430 of the order 400 comprises a tip amount specified by the user for the picker fulfilling the order 400. In some embodiments, an attribute 430 of an order 400 describes weather occurring when the order 400 was fulfilled, as certain types of weather influence availability of various items at a retailer and an amount of time for a picker to fulfill the order 400. An additional example attribute 430 of the order 400 is a holiday indication whether a holiday occurs within a threshold amount of time from a time for fulfillment indicated in the order 400.

Based on the characteristics 450 of the user and the attributes 430 of the order 400, the proactive remediation model 420 determines a probability 425 of churn of the user occurring without the online concierge system 140 performing a remedial action before receiving a notification of the problem with fulfillment of the order from the user. Based on the probability 425 of churn of the user occurring without the online concierge system 140 performing a remedial action before receiving a notification of the problem with fulfillment of the order from the user, the online concierge system 140 generates a set 440 of expected values, with each expected value corresponding to a remedial action 435. As further described above in conjunction with FIG. 3, the online concierge system 140 may perform different remedial actions 435 to mitigate a problem with order fulfillment. Each remedial action 435 has an associated cost to be performed to the online concierge system 140, and the online concierge system 140 accounts for the cost of performing a remedial action 435, the probability 425 of churn of the user occurring without the online concierge system 140 performing a remedial action before receiving a notification of the problem with fulfillment of the order from the user, and an expected amount of revenue to the online concierge system 140 from the user when generating an expected value for a remedial action 435, as further described above in conjunction with FIG. 3.

Based on the set 440 of expected values, the online concierge system 140 selects a remedial action and transmits the selected remedial action 445 to a user client device 100 before the online concierge system 140 receives a notification of the problem with order fulfillment from the user, as further described above in conjunction with FIG. 3. For example, the online concierge system 140 transmits the selected remedial action 445 to the user client device 100 at a time when a picker delivers the one or more items included in the order 400 to a location included in the order 400. As another example, the online concierge system 140 transmits the selected remedial action 445 to the user client device 100 before the time when the picker delivers the one or more items included in the order 400 to the location included in the order. Transmitting the selected remedial action 445 to the user client device 100 before the online concierge system 140 receives a notification of the problem with the order 400 allows the online concierge system 140 to proactively mitigate a problem with fulfillment that the online concierge system 140 identified, decreasing a likelihood of the problem reducing subsequent interaction with the online concierge system 140 by the user. Additionally, transmitting the selected remedial action 445 to the user client device 100 based on the online concierge system 140 identifying 415 the problem with order fulfillment allows the online concierge system 140 to provide remedial actions to a larger number of users than when transmission of remedial actions is conditioned on the online concierge system 140 receiving a notification of a problem with order fulfillment from the user.

Additional Considerations

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

receiving, at the computer system, an order from a user, the order including one or more items to obtain from a retailer;

receiving, at the computer system, information describing fulfillment of the order from a picker fulfilling the order;

identifying, from the information describing fulfillment of the order, a problem with fulfillment of the order;

generating a probability of churn of the user occurring without the computer system performing a remedial action before receiving a notification of the problem with fulfillment of the order from the user by applying a proactive remediation model to characteristics of the user and to attributes of the order, wherein the proactive remediation model is a classification neural network that is trained by:

obtaining a training dataset including a plurality of training examples, each training example including characteristics of a training user and attributes of a prior order fulfilled for the training user, each training example having a label indicating whether churn occurred for the training user in response to fulfillment of the prior order, wherein obtaining the training dataset comprises generating an order issue attribute of the attributes of the prior order for each of the plurality of training examples, wherein generating the order issue attribute for a training example comprises:

receiving image data captured by a camera of a client device associated with a picker who serviced the prior order of the training example, wherein the image data depicts a set of items picked by the picker for the prior order;

applying a computer-vision machine-learning model to the image data to generate a prediction for the set of items picked by the picker for the prior order;

comparing the prediction for the set of items to a set of items ordered by the training user to identify at least one item in the set of items ordered by the user that is not in the prediction of the set of items; and responsive to identifying the at least one item, generating the order issue attribute for the training example to indicate an issue with the prior order;

wherein obtaining the training dataset comprises generating the label indicating whether churn occurred for a training example by:

measuring a first rate of user interaction with a user interface of a client application associated with an online system executing on a client device of the user, wherein the first rate of user interaction is measured before placement of the prior order associated with the training example;

measuring a second rate of user interaction with the user interface of the client application associated with the online system executing on the client device of the user, wherein the second rate of user interaction is measured after placement of the prior order associated with the training example;

comparing the first rate of user interaction with the second rate of user interaction to determine a decrease in the rate of user interaction from the first rate to the second rate; and responsive to determining the decrease, generating the label to indicate a churn for the user;

applying the proactive remediation model to each training example of the training dataset to generate a predicted probability of churn of the training user occurring without providing a remedial action before the computer system receives a notification of a problem with fulfilment of the prior order from the training user;

scoring the proactive remediation model using a loss function and the label of the score training example; and updating one or more parameters of the proactive remediation model by backpropagation based on the scoring until one or more criteria are satisfied;

generating an expected value for one or more candidate remedial actions based on the probability of churn of the user occurring, the expected value for the candidate remedial action based on a cost of the candidate remedial action to the computing system and the probability of churn from the proactive remediation model;

selecting a candidate remedial action based on the expected values; and transmitting the selected candidate remedial action to a user client device of the user before the computer system receives the notification of the problem with order fulfillment from the user.

2. The method of claim 1, wherein transmitting the selected candidate remedial action to the user client device of the user comprises:

transmitting the selected candidate remedial action to the user client device of the user at a time when the picker delivered the one or more items to a location included in the order.

3. The method of claim 1, wherein transmitting the selected candidate remedial action to the user client device of the user comprises:

transmitting the selected candidate remedial action to the user client device of the user at a time before the picker delivered the one or more items to a location included in the order.

4. The method of claim 1, wherein selecting the candidate remedial action comprises selecting one or more of: providing a credit to the user, providing a discount for the order to the user, providing a discount for a subsequent order to the user, or providing free delivery of the items in the order to the user.

5. The method of claim 1, wherein applying the proactive remediation model to characteristics of the user comprises applying the proactive remediation model to is one or more of: a churn rate of the user determined from orders previously fulfilled for the user, a number of orders previously received from the user, or a cumulative number of orders received from the user, or an indication whether a count of orders received from the user is less than a threshold number.

6. The method of claim 1, wherein applying the proactive remediation model to attributes of the order comprises applying the proactive remediation model to one or more of: a rate at which an item in the order that the computer system determined was unable to be obtained from the retailer included in the order when identifying the problem with fulfillment of the order, a type of the item in the order that the computer system determined was unable to be obtained from the retailer included in the order when identifying the problem with fulfillment of the order, a type of retailer included in the order, an order type of the order, or a tip amount specified by the user for the picker fulfilling the order.

7. The method of claim 6, wherein the type of item in the order that the computer system determined was unable to be obtained from the retailer included in the order when identifying the problem with fulfillment of the order comprises an indication of whether the item in the order that the computer system determined was unable to be obtained from the retailer included in the order when identifying the problem with fulfillment of the order is a foundational item for the order.

8. The method of claim 1, wherein applying the proactive remediation model to attributes of the order comprises applying the proactive remediation model to one or more of: a description of describes weather when the order was fulfilled, or a holiday indication whether a holiday occurs within a threshold amount of time from a time for fulfillment indicated in the order.

9. The method of claim 1, wherein generating the expected value for one or more candidate remedial actions based on the probability of churn of the user occurring comprises:

generating the expected value for one or more candidate remedial actions based on the probability of churn of the user occurring in response to the probability of churn of the user occurring equaling or exceeding a threshold value.

10. A computer program product comprising a non-transitory computer readable storage medium having instructions encoded thereon that, when executed by a processor, cause the processor to perform steps comprising:

receiving, at the computer system, an order from a user, the order including one or more items to obtain from a retailer;

receiving, at the computer system, information describing fulfillment of the order from a picker fulfilling the order;

identifying, from the information describing fulfillment of the order, a problem with fulfillment of the order;

generating a probability of churn of the user occurring without the computer system performing a remedial action before receiving a notification of the problem with fulfillment of the order from the user by applying a proactive remediation model to characteristics of the user and to attributes of the order, wherein the proactive remediation model is a classification neural network that is trained by:

obtaining a training dataset including a plurality of training examples, each training example including characteristics of a training user and attributes of a prior order fulfilled for the training user, each training example having a label indicating whether churn occurred for the training user in response to fulfillment of the prior order, wherein obtaining the training dataset comprises generating an order issue attribute of the attributes of the prior order for each of the plurality of training examples, wherein generating the order issue attribute for a training example comprises:

receiving image data captured by a camera of a client device associated with a picker who serviced the prior order of the training example, wherein the image data depicts a set of items picked by the picker for the prior order;

applying a computer-vision machine-learning model to the image data to generate a prediction for the set of items picked by the picker for the prior order;

comparing the prediction for the set of items to a set of items ordered by the user to identify at least one item in the set of items ordered by the user that is not in the prediction of the set of items; and responsive to identifying the at least one item, generating the order issue attribute for the training example to indicate an issue with the prior order;

wherein obtaining the training dataset comprises generating the label indicating whether churn occurred for a training example by:

measuring a first rate of user interaction with a user interface of a client application associated with the online system executing on a client device of the user, wherein the first rate of user interaction is measured before placement of the prior order associated with the training example;

measuring a second rate of user interaction with the user interface of the client application associated with the online system executing on the client device of the user, wherein the second rate of user interaction is measured after placement of the prior order associated with the training example;

comparing the first rate of user interaction with the second rate of user interaction to determine a decrease in the rate of user interaction from the first rate to the second rate; and responsive to determining the decrease, generating the label to indicate a churn for the user;

applying the proactive remediation model to each training example of the training dataset to generate a predicted probability of churn of the training user occurring without providing a remedial action before the computer system receives a notification of a problem with fulfilment of the prior order from the training user;

scoring the proactive remediation model using a loss function and the label of the score training example; and updating one or more parameters of the proactive remediation model by backpropagation based on the scoring until one or more criteria are satisfied;

generating an expected value for one or more candidate remedial actions based on the probability of churn of the user occurring, the expected value for the candidate remedial action based on a cost of the candidate remedial action to the computing system and the probability of churn from the proactive remediation model;

selecting a candidate remedial action based on the expected values; and transmitting the selected candidate remedial action to a user client device of the user before the computer system receives the notification of the problem with order fulfillment from the user.

11. The computer program product of claim 10, wherein transmitting the selected candidate remedial action to the user client device of the user comprises:

transmitting the selected candidate remedial action to the user client device of the user at a time when the picker delivered the one or more items to a location included in the order.

12. The computer program product of claim 10, wherein transmitting the selected candidate remedial action to the user client device of the user comprises:

transmitting the selected candidate remedial action to the user client device of the user at a time before the picker delivered the one or more items to a location included in the order.

13. The computer program product of claim 10, wherein selecting the candidate remedial action comprises selecting one or more of: providing a credit to the user, providing a discount for the order to the user, providing a discount for a subsequent order to the user, or providing free delivery of the items in the order to the user.

14. The computer program product of claim 10, wherein applying the proactive remediation model to characteristics of the user comprises applying the proactive remediation model to is one or more of: a churn rate of the user determined from orders previously fulfilled for the user, a number of orders previously received from the user, or a cumulative number of orders received from the user, or an indication whether a count of orders received from the user is less than a threshold number.

15. The computer program product of claim 10, wherein applying the proactive remediation model to attributes of the order comprises applying the proactive remediation model to one or more of: a rate at which an item in the order that the computer system determined was unable to be obtained from the retailer included in the order when identifying the problem with fulfillment of the order, a type of the item in the order that the computer system determined was unable to be obtained from the retailer included in the order when identifying the problem with fulfillment of the order, a type of retailer included in the order, an order type of the order, or a tip amount specified by the user for the picker fulfilling the order.

16. The computer program product of claim 15, wherein the type of item in the order that the computer system determined was unable to be obtained from the retailer included in the order when identifying the problem with fulfillment of the order comprises an indication of whether the item in the order that the computer system determined was unable to be obtained from the retailer included in the order when identifying the problem with fulfillment of the order is a foundational item for the order.

17. The computer program product of claim 10, wherein applying the proactive remediation model to attributes of the order comprises applying the proactive remediation model to one or more of: a description of describes weather when the order was fulfilled, or a holiday indication whether a holiday occurs within a threshold amount of time from a time for fulfillment indicated in the order.

18. The computer program product of claim 10, wherein generating the expected value for one or more candidate remedial actions based on the probability of churn of the user occurring comprises:

generating the expected value for one or more candidate remedial actions based on the probability of churn of the user occurring in response to the probability of churn of the user occurring equaling or exceeding a threshold value.

19. A system comprising:

a processor; and a non-transitory computer readable storage medium having instructions encoded thereon that, when executed by the processor, cause the processor to perform steps comprising:

receiving, at the computer system, an order from a user, the order including one or more items to obtain from a retailer;

receiving, at the computer system, information describing fulfillment of the order from a picker fulfilling the order;

identifying, from the information describing fulfillment of the order, a problem with fulfillment of the order;

generating a probability of churn of the user occurring without the computer system performing a remedial action before receiving a notification of the problem with fulfillment of the order from the user by applying a proactive remediation model to characteristics of the user and to attributes of the order, wherein the proactive remediation model is a classification neural network that is trained by:

obtaining a training dataset including a plurality of training examples, each training example including characteristics of a training user and attributes of a prior order fulfilled for the training user, each training example having a label indicating whether churn occurred for the training user in response to fulfillment of the prior order, wherein obtaining the training dataset comprises generating an order issue attribute of the attributes of the prior order for each of the plurality of training examples, wherein generating the order issue attribute for a training example comprises:

receiving image data captured by a camera of a client device associated with a picker who serviced the prior order of the training example, wherein the image data depicts a set of items picked by the picker for the prior order;

applying a computer-vision machine-learning model to the image data to generate a prediction for the set of items picked by the picker for the prior order;

comparing the prediction for the set of items to a set of items ordered by the user to identify at least one item in the set of items ordered by the user that is not in the prediction of the set of items; and responsive to identifying the at least one item, generating the order issue attribute for the training example to indicate an issue with the prior order;

wherein obtaining the training dataset comprises generating the label indicating whether churn occurred for a training example by:

measuring a first rate of user interaction with a user interface of a client application associated with the online system executing on a client device of the user, wherein the first rate of user interaction is measured before placement of the prior order associated with the training example;

measuring a second rate of user interaction with the user interface of the client application associated with the online system executing on the client device of the user, wherein the second rate of user interaction is measured after placement of the prior order associated with the training example;

comparing the first rate of user interaction with the second rate of user interaction to determine a decrease in the rate of user interaction from the first rate to the second rate; and responsive to determining the decrease, generating the label to indicate a churn for the user;

applying the proactive remediation model to each training example of the training dataset to generate a predicted probability of churn of the training user occurring without providing a remedial action before the computer system receives a notification of a problem with fulfilment of the prior order from the training user;

scoring the proactive remediation model using a loss function and the label of the score training example; and updating one or more parameters of the proactive remediation model by backpropagation based on the scoring until one or more criteria are satisfied;

generating an expected value for one or more candidate remedial actions based on the probability of churn of the user occurring, the expected value for the candidate remedial action based on a cost of the candidate remedial action to the computing system and the probability of churn from the proactive remediation model;

selecting a candidate remedial action based on the expected values; and transmitting the selected candidate remedial action to a user client device of the user before the computer system receives the notification of the problem with order fulfillment from the user.

20. The system of claim 19, wherein transmitting the selected candidate remedial action to the user client device of the user comprises:

transmitting the selected candidate remedial action to the user client device of the user at a time when the picker delivered the one or more items to a location included in the order.

* * * * *